United States Patent [19]

Jakob

[11] Patent Number: 5,573,470
[45] Date of Patent: Nov. 12, 1996

[54] JOINING DEVICE FOR CONVEYOR BELTS AND METHOD

[75] Inventor: Horst Jakob, Deaux, France

[73] Assignee: ASER, Saint-Chamond, France

[21] Appl. No.: 454,232

[22] PCT Filed: Oct. 18, 1994

[86] PCT No.: PCT/FR94/01206

§ 371 Date: Jun. 13, 1995

§ 102(e) Date: Jun. 13, 1995

[87] PCT Pub. No.: WO95/11393

PCT Pub. Date: Apr. 27, 1995

[30] Foreign Application Priority Data

Oct. 20, 1993 [FR] France ................. 93 12522

[51] Int. Cl.⁶ ........................................ F16G 3/00
[52] U.S. Cl. ................ 474/255; 474/257; 198/844.2
[58] Field of Search ......................... 474/237, 253, 474/255, 257; 198/844.2

[56] References Cited

U.S. PATENT DOCUMENTS

| | | | |
|---|---|---|---|
| 752,512 | 2/1904 | Buckley | 474/257 X |
| 2,446,311 | 8/1948 | Traxler | 474/257 |
| 2,449,950 | 9/1948 | Nassimbene | 474/255 X |
| 3,084,408 | 4/1963 | Ireland | 474/257 X |
| 3,279,090 | 10/1966 | Harper | 474/257 X |
| 3,839,766 | 10/1974 | Kenney | 474/257 X |
| 4,315,349 | 2/1982 | Stolz | 474/253 X |
| 5,419,744 | 5/1995 | Kagebeck | 474/255 X |

FOREIGN PATENT DOCUMENTS

| | | |
|---|---|---|
| 352082 | 8/1905 | France . |
| 832366 | 2/1952 | Germany . |
| 2532409 | 2/1977 | Germany . |

*Primary Examiner*—Roger J. Schoeppel
*Attorney, Agent, or Firm*—Browdy and Neimark

[57] ABSTRACT

The joining device according to the invention has generally the form of an H shaped profile, the central part (6) of which forming the central bar of the H is extended by two opposite pairs of arms (2', 2", 2''', 2'''') forming the branches of the H, the said arms extending in a longitudinal direction along a length several times larger than the bigger dimension of the central part (6) forming the bar of the H of the joining device in a cross-section view, the said central part (6) as well as the arms (2', 2", 2''', 2'''') being made up of a flexible and elastic material, the flexibility and elasticity of the said material being close to the flexibility and to the elasticity of the constituent material of the conveyor belt for which the joining device is provided. The material of the joining devices according to the invention can be provided with a reinforcement (4).

21 Claims, 6 Drawing Sheets

JOINING DEVICE FOR CONVEYOR BELTS AND METHOD

The present invention is related to a joining device for conveyor belt, which is flexible resistant and which can be set quickly into position, as well as to fastening methods.

Conveyor belts, made generally with a flexible and tensile material, including most often a carrier reinforcement, said material being a synthetic and possibly natural rubber, or a synthetic material such as polyurethan or other synthetic materials having flexibility and strenght properties allied to a certain elasticity, are well known. These conveyor belts, mounted on a driving roller and on an idle roller, possibly supported along their track or guide rollers or supporting rollers, are used for carrying coal, minerals, industrial products in scraps or in powder, and even for carrying singled articles, such as cardboad or wood boxes, luggage etc. This listing is far from being exhaustive, since the fields of application of the conveyor belts are diversified, and new ones appeared permanently.

It is the reason why, the dimension, the strength and the constituent material of the conveyor belts vary within large limits.

Two methods of joining are known heretofore. The first one consists in sticking the ends of the conveyor belt or to assemble them by vulcanisation. The ends of the conveyor belt are prepared in view of these operations in such a way as the surfaces to be stuck or vulcanised together are cut out accurately and stepwise and ready for these sticking or vulcanisation operations. These sticking or vulcanisation operations are time-consuming, and the conveyor belt could be out of service for as long as 24 hours. They present the advantage of keeping quite completely the flexibility and the elasticity of the conveyor belt in the joining area. They are often carried out with difficulty, for instance in quarries or building works or in areas adjacent to the working face, in mines, due to the prevailing conditions (space limitation, dust, explosion risks, etc.) and to the difficulty encountered for preparing correctly the surface under such conditions.

The second method consists in using metallic staples or clamps or metallic staple small bars or strips, U-shaped, arranged on the ends of the conveyor belt fastened on these latter by means of studs or of rivets, mounted close to each other and mutually interleaving, a linking or hinging rod passing through the interleaving staples to form a hinged joining device between the ends of the conveyor belt linked together in that way. These devices have proved satisfactory due especially to the fast implementation of the joining, but they are very quickly worn out and must be frequently replaced, very often under emergency conditions, due to the wear of the linking and hinging rod, and even to the stripping of at least some of the staples. These problems result mainly from the unavoidable stiffness of these metallic staples and to the wear of the linking and hinging rods, produced by the relative rotative movements of the staples and of the linking and hinging rod caused by the movement of the conveyor belt itself.

The object of the present invention is to provide a novel joining device which keeps the flexibility and elasticity advantages of the joinings obtained by direct sticking or vulcanisation of the conveyor belt ends, but the implementation of which is much more easy, especially in the aggressive environmental conditions (mines, works) and mainly much more fast than the direct sticking and vulcanisation methods, while being at least equally wear resistant and liable.

The problem as such is solved by means of joining devices of a generally H-shaped profile, the central part of which, forming the central H bar is extended by two opposite pairs of arms forming the H branches, the said arms having a longitudinal extension, several times more important than the biggest dimension of the central part which forms the H bar of the device in cross-section view, the said central part as well as the arms, being made of a flexible and resilient material, the flexibility and the elasticity of the said material being quite similar to the flexibility and to the elasticity of the constituent material of the conveyor belt on which the joining device has to be mounted. The material of the joining devices, according to the invention, may be advantageously reinforced for instance by means of cut fibres or by means of a flexible reinforcement having a certain elasticity, embedded in the said central part and in the said arms.

The edges of the arms located the most remotely from the central part are advantageously bevelled, the bevel presenting a slope which extends from the external surface of the arm and which connects the unbevelled part of the edge, in such way as the unbevelled part is of relatively small height.

The joining device according to the invention can be achieved either by extrusion, using known methods for setting the reinforcement, when it is present, the continuous product thus obtained being then cut out in sections of suitable length for matching with conveyor belts of various widths, while it is possible to use several sections end to end in order to obtain a joining device of a length corresponding to the width of the conveyor belt. The joining device can also be obtained by moulding, by hot pressing or calendering or by vulcanisation. In this latter case too, methods are known for maintaining fix the reinforcement during moulding, in the case where the joining device according to the invention includes such a reinforcement.

In order to achieve the joining of the conveyor belts, the ends of the conveyor belt are introduced in the space located between two arms positioned on the same side of the central part of the joining device, the distance between these two arms being purposedly just approximately equal to the thickness of the conveyor belt. The ends of the conveyor belt being in that way introduced individually between two arms of the joining device which forms one of the two pairs of arms located on the opposite sides of the central part of the joining device, the fastening of each end of the conveyor belt to the two arms between which, each end is introduced, is thus achieved. This fastening can be obtained by sticking or vulcanisation. This sticking or this vulcanisation is carried out, surface against surface, the internal surface of an arm against the external surface of the conveyor belt, and the internal surface of the other arm against the other external surface of the conveyor belt. It is very difficult to carry out perfect bevelled or stepped cuttings of the conveyor belt ends in an aggressive environment. When using the joining device according to the invention the conveyor belt is cut as straightly as possible, and even if some irregularities are present, these latter are not detrimental to the sticking or to the vulcanisation which are carried out on existing surfaces, i.e. the internal surfaces of the arms and the external surfaces of the conveyor belt.

The joining can also be carried out by means of pointed pins or studs which cross through an arm, through the conveyor belt and through the other arm, the sharp pointed ends being bent down on the side where they projected after these operations. Washers or small bars or strips can be embedded in the arms through holes being provided across these arms for the passage of these sharp pointed pins or studs. These washers or small plates or strips increase the strength and the useful life of the fastening by preventing the tearing of the arms and/or of the conveyor belt by the stem of the pins or of the studs which are submitted to excessive tensions during the operation of the conveyor belt, the joining of which is carried out by means of a joining device according to the invention, fixed in that way on the conveyor belt.

The external face of the washers or of the strips, are advantageously internally distant from the external face of the arm, by a length equal at least to the height of the head of the fastening means provided with a stem, used in the device.

In order to obtain a higher strength and a longer service life for the fastening, the washers or the strips may be integral or quite integral with the arms reinforcement, according to several implementations which will be described further on, in relation with examples of embodiments and with the corresponding drawings.

The reinforcements may be made in various resisting flexible and elastic materials, their flexibility being close to that of the constituent material of the joining device involved; their elasticity enables them absorbing, in association with the constituent material, the unavoidable tensions during the operation of the conveyor belt, in particular during the passage over the rollers, due to the track difference between the upper face of the conveyor belt with respect to the track of the lower face. These materials may be for instance, a fabric, a knitted fabric, a net, a lattice, an unweaved fabric, a metallic sheet, or a synthetic material sheet. They can also be made of metallic or synthetic material cables, these cables presenting if required sinuosities or zigzag arrangements, in order to enable them, in association with the flexible and elastic constituent material of the joining device according to the present invention, to match resiliently with this material, better than the same cable arranged neither with sinuosities nor with a zigzag arrangement.

The invention will be described now in detail, in relation with selected embodiments, given by way of non limitative examples, shown on the drawings, in which.

Figure 1:
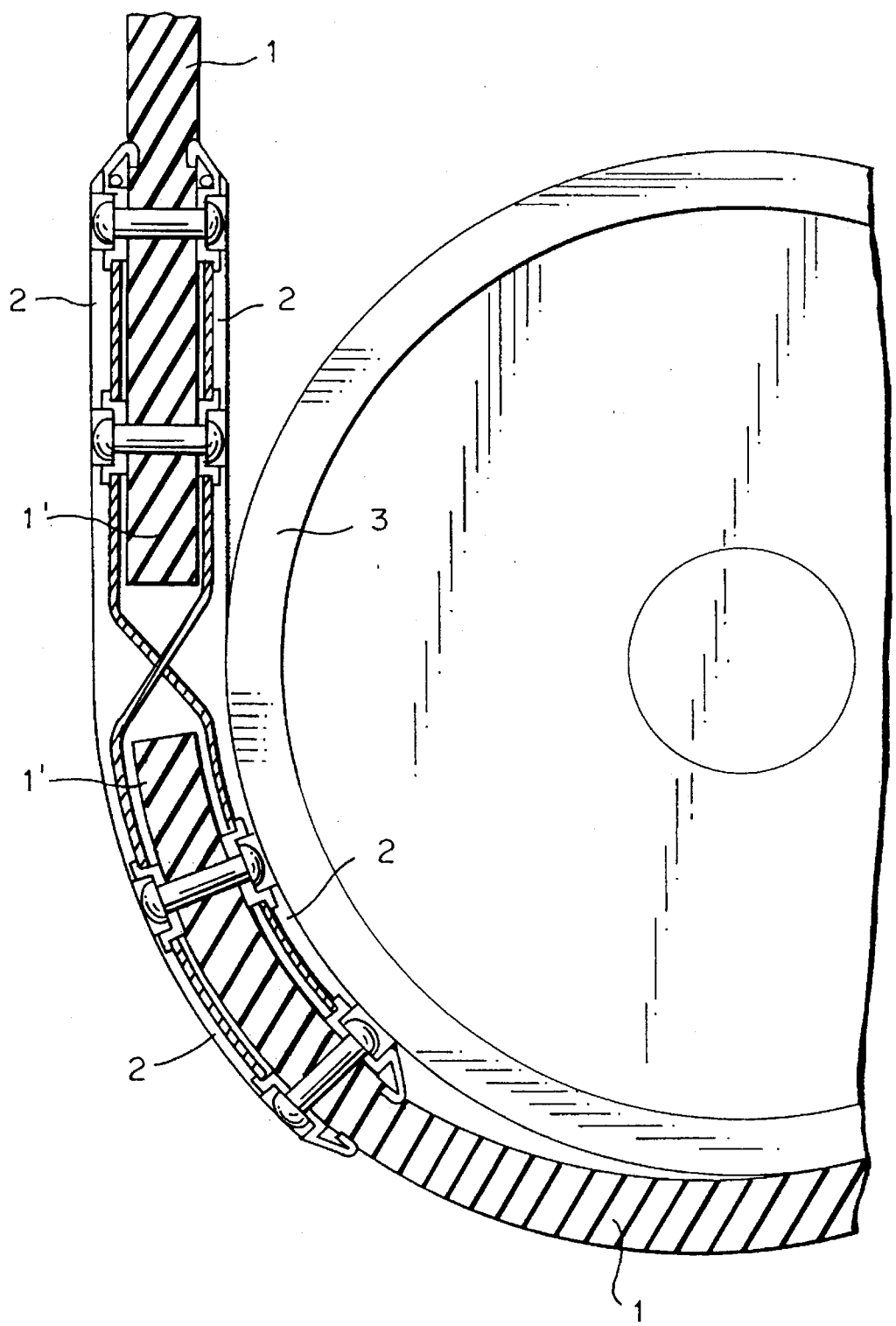
FIG. 1 is a longitudinal cross-section view of a joining device according to the invention, mounted on a conveyor belt during its passage over one of the rollers around which the conveyor belt is mounted.

FIGS. 6, 7 and 8 and 9 are perspective views of bare joining devices according to the invention, corresponding respectively to the joining devices according to the invention shown on FIGS. 2, 3, 4 and 5.

In the whole of the description, the terms longitudinal and transversal directions mean respectively the length direction of the conveyor belt and the width direction of this latter, even when these terms are applied to the joining device and even when this latter is bare and supposed to have already been fixed to the conveyor belt.

In the same way, the term horizontal means on one line or in a plane, parallel to the plane containing the operative face of the conveyor belt, this latter being mounted either horizontally or in a skewed direction; the term vertical means perpendicular to the plane containing the operative face of the conveyor belt.

It has to be noted that for the clarity of the drawing, the arms have been drafted with a thickness intentionaly larger than that corresponding to the scale with respect to the thickness of the belt. Actually, these arms, generally strengthened by a reinforcement are much more thinner, without any detriment to their strength during the operation of the device.

The references used concern the same elements or similar elements all over the figures.

The aim of FIG. 1 is to show the flexible qualities of the joining device according to the invention, these qualities being required during the operation of the conveyor belt on which it is mounted. The figure shows the conveyor belt 1, the ends of this latter being engaged between the arms 2, the belt passing on a roller 3. The joining device according to the invention shown on the Figure, comprises a reinforcement and fastening washers which will be described with more details in relation with FIG. 2.

Figure 2:
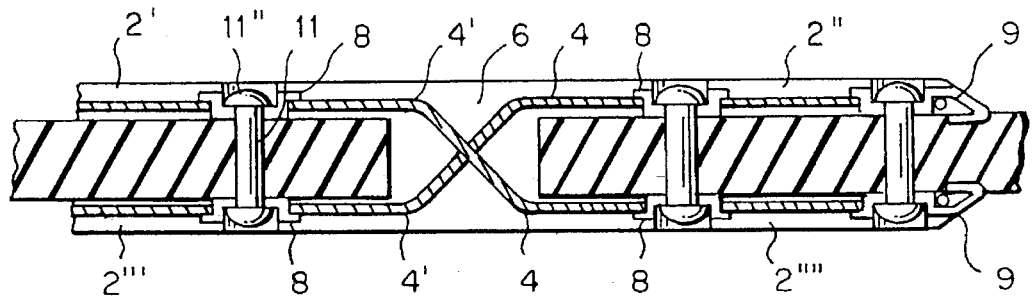
FIG. 2 is a longitudinal cross-section view of a joining device according to the invention, of the same type as the one shown on FIG. 1 but in a flat position.

FIG. 2 represents the joining device of FIG. 1 according to the invention shown in this case in a flat position. The reinforcement 4 is made of cables 4' which can also be observed, otherwise on the perspective view of the same joining device of FIG. 6, which includes a partial sectional view, exposing the reinforcement. These cables 4' extend in an arm 2' or 2"; they may present sinuosities 5, observed on the partial sectional view of FIG. 6, then they cross through the central part 6 where they pass in a skewed direction by shifting to another plane, to further extend in an arm 2"" or 2"', located on the opposite side and in a plane different from that of the previous arm 2' or 2"; they form a trimming loop 7 around a washer 8, or around a small bar or strip 9, and extend back in the opposite direction to cross once again in a skewed direction, the central part 6 and so on. The washers 8, or the strips 9 are provided with one or several holes 10 used for the passage of the fastening means 11, provided with stems made for instance of sharp pointed pins 11', rivets 11", studs 11"', screws and nuts 11"", used for fastening the arms on the corresponding ends of the conveyor belt. It is understood that the joining device according to the embodiment of the invention shown, is at one and the same time very flexible, owing to the flexibility of its constituents, very strong, owing to the presence of the reinforcement, while presenting the desired elasticity; therefore, it is not torn away, in spite of the tension forces applied to the arms during operation, by the crossing through stems of the fastening means 11, due to the presence of the washers 8 or of the strips 9 and to their trimming to the reinforcement 4.

Figure 6:
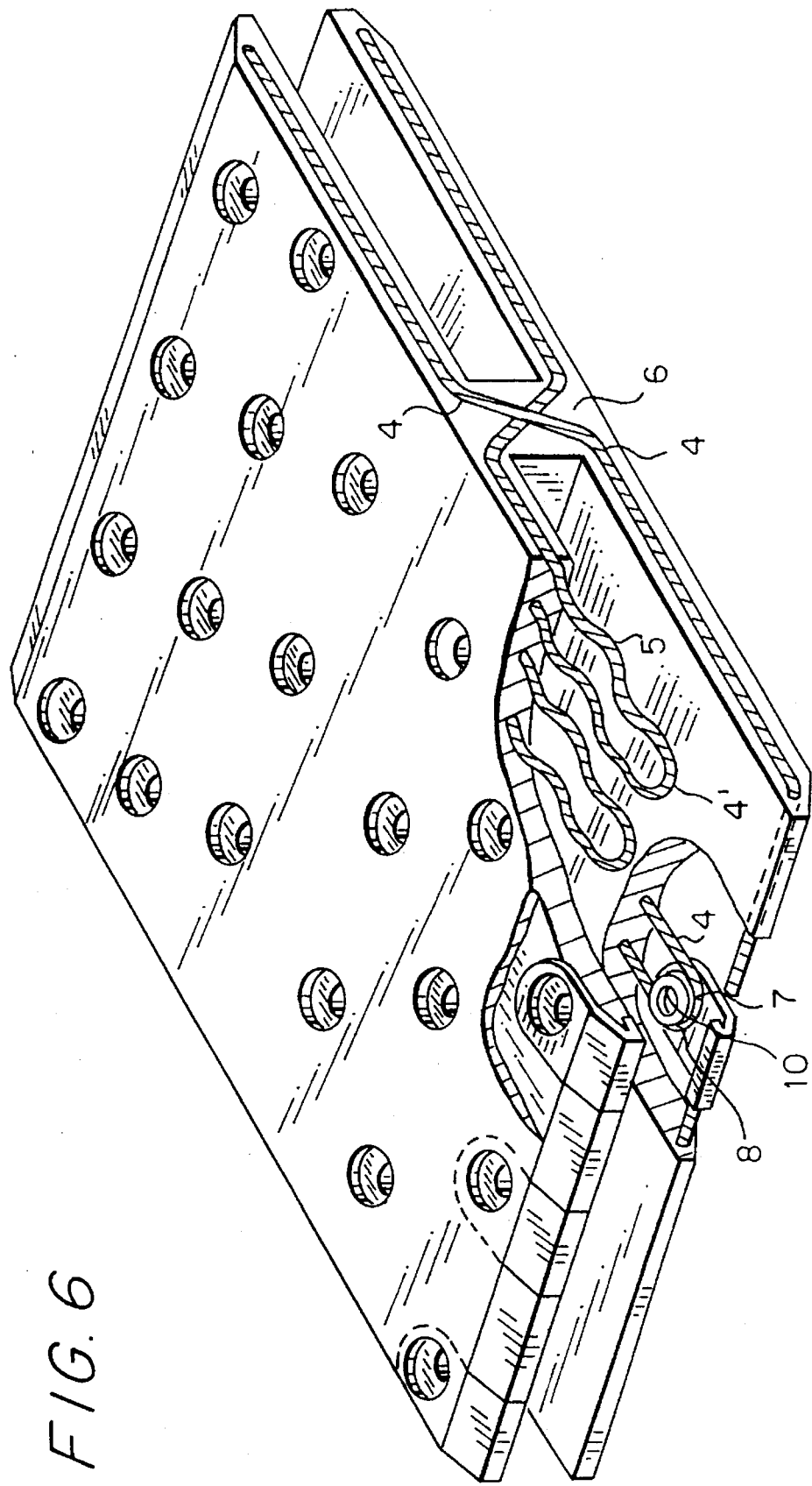

The arrangement of the reinforcement shown on FIGS. 2 and 6 can be featured as an "X" shaped reinforcement.

Figure 3:
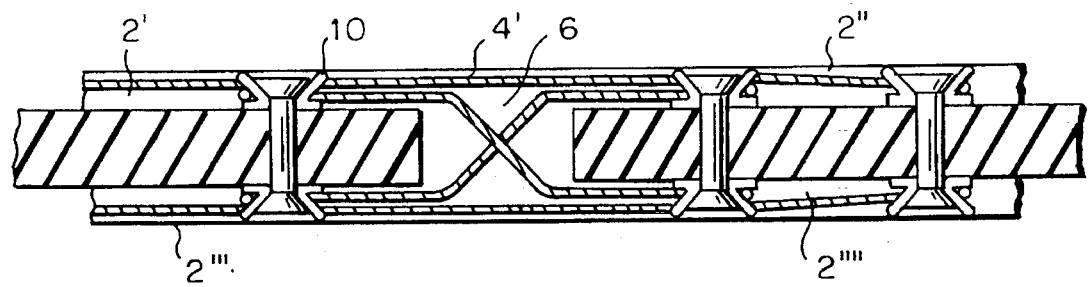
FIG. 3 is a longitudinal cross-section view of a joining device according to the invention, its reinforcement and its fastening means being different from the reinforcement and the fastening means of the previous one.
Figure 7:
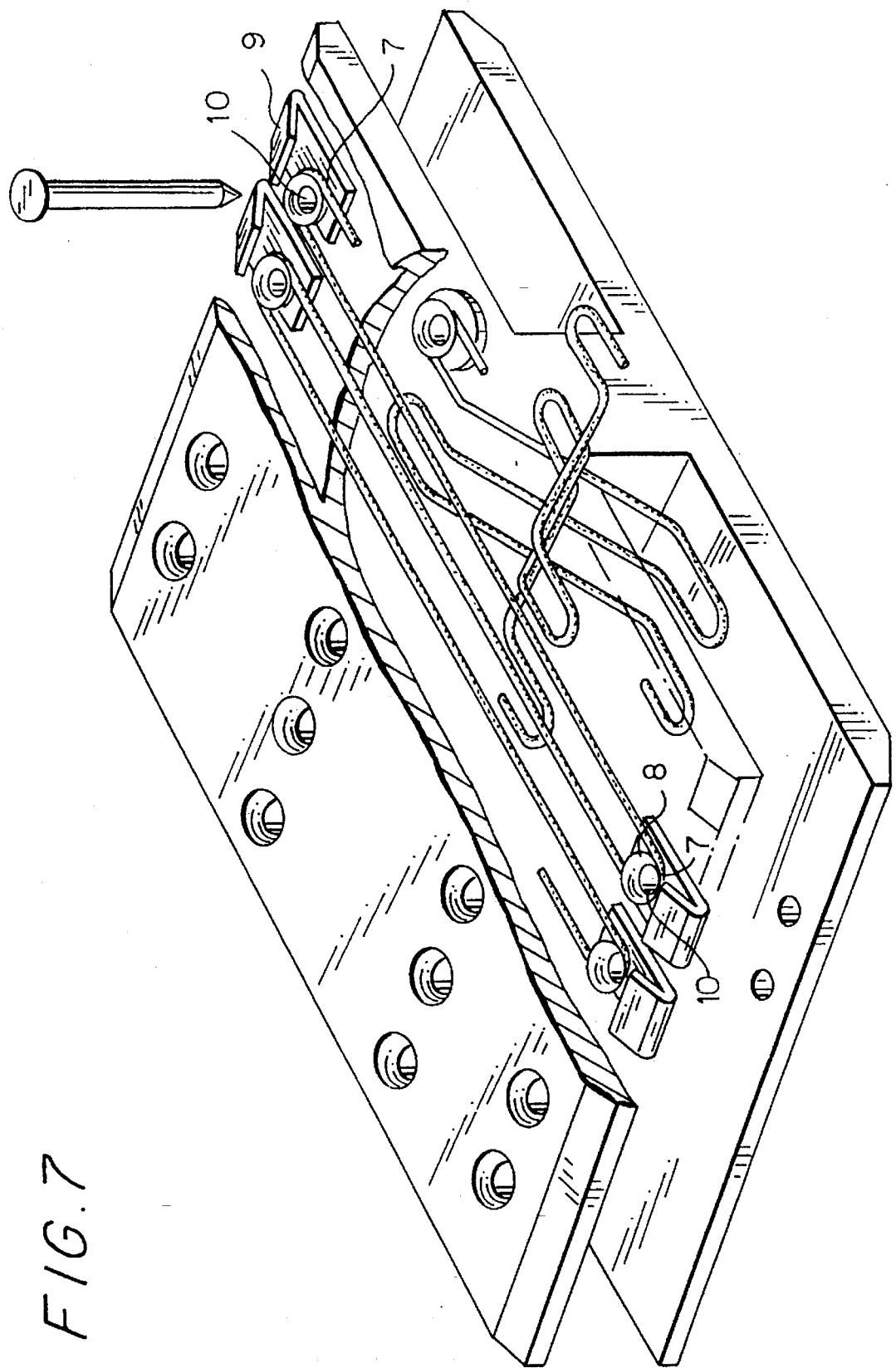

FIG. 3 shows another joining device according to the invention, which is also represented in perspective on FIG. 7, with a partial sectional view exposing the reinforcement arrangement. The joining device acording to the invention thus represented comprises a reinforcement generally of the same type as the one shown on FIG. 2, but with the addition to the "X" shaped reinforcement of two additional layers, which are also made of cables 4' crossing the central part 6 while remaining in the same plane, passing from one arm 2' or 2"' to the other arm 2" or respectively 2"" located in the same plane on the other side of the central part, the cable forming trimming loops, successively in one arm then in the opposite arm, around the washers or the strips rooted in the arms, these two additional layers being included in the joining device positioned more outwardly than the two reinforcement "X" shaped layers.

Figure 4:
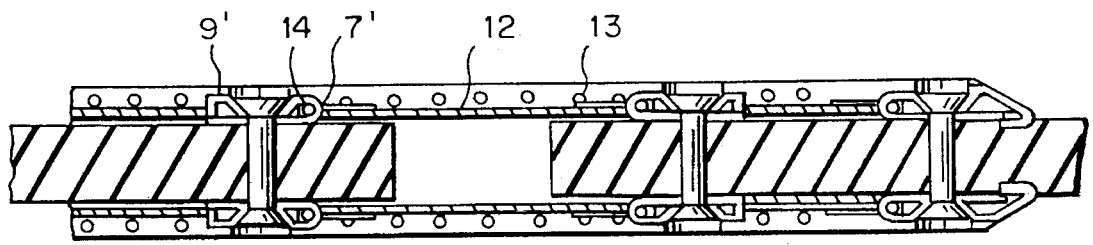
FIGS. 4 and 5 represent further types of joining devices according to the invention, also in flat sectional view, mounted on the ends of the conveyor belt.
Figure 8:
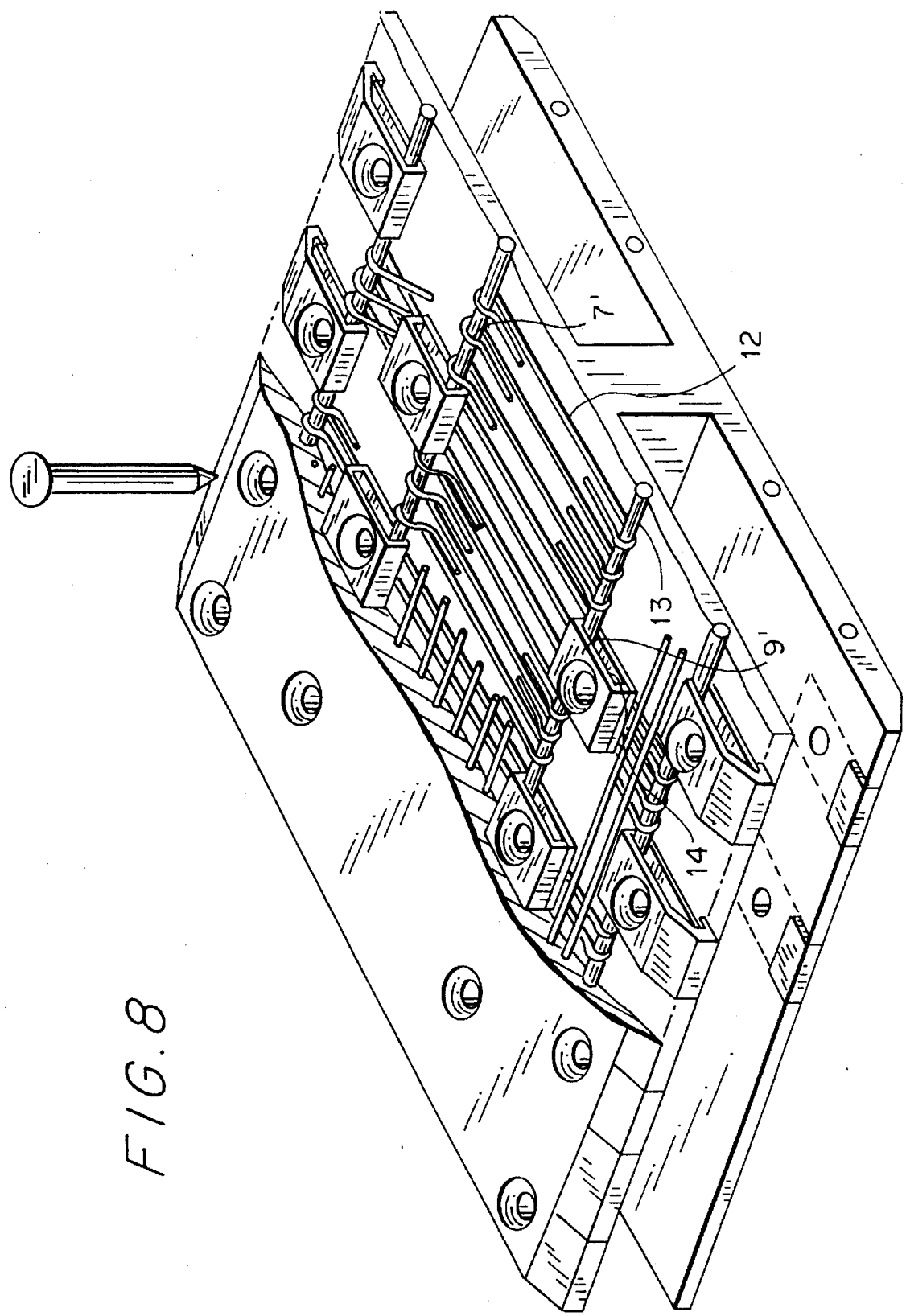

FIG. 4 shows still another joining device according to the invention, in which the reinforcement, still made of cables, which can also be shown on the perspective view with partial sectional view of FIG. 8, does not include the "X" shaped part, as in the case of the joining devices according to the invention of FIGS. 2 and 3, but only cables arranged in two layers, with one layer linking an arm to the opposite arm located on two other side of the central part and in the same plane, the other layer linking the two other opposed arms, while remaining in the same plane. The arrangement of the reinforcement cables is quite different from that of the reinforcements described previously. Effectively in this case, short lengths of cables are involved, which do not form successive trimming loops in one arm then in the opposite arm and so on. These short length cables, called further on linking cables 12, extend from one arm to the other, crossing the central part, the trimming of the small bars or strips being obtained through strengthening cables 13, arranged transversally (while the linking cables 12 are arranged longitudinally) the meaning of the terms transversal and longitudinal being that defined hereabove; these strengthening cables 13 arranged transversally pass across through holes 14 provided in the strips 9', the linking cables 12 being folded around the strengthening cables 13 to form trimming loops 7', the face end 15 of the loop thus formed being embedded in the material arranged along the other end over a certain length.

It is understood that for the clarity of the drawing, the linking cables 12 and the strengthening cables 13 have been shown well separate from each other, although actually they are very close to each other, and even in certain cases in mutual contact.

Besides their function related to the trimming of the strips in association with the linking cables 12 the ends of which are folded around the strengthening cables 13, these latter have other functions, i.e.:

they maintain the trimming loops of the linking wires in a flat position, thus preventing them from lifting, they increase the adhesion by bridging the linking cables in the material (and by producing a counter pressure during the passage of the joining device according to the invention on the conveyor rollers), they maintain the distance between the strips, in the longitudinal direction, they secure the transversal dimension of the joining device.

Figure 5:
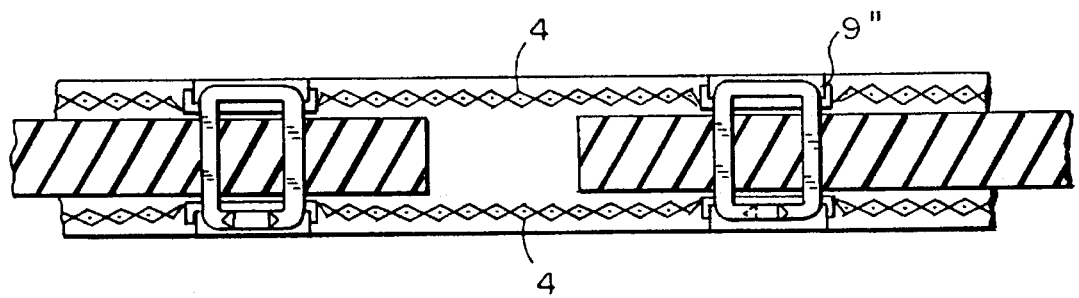
Figure 9:
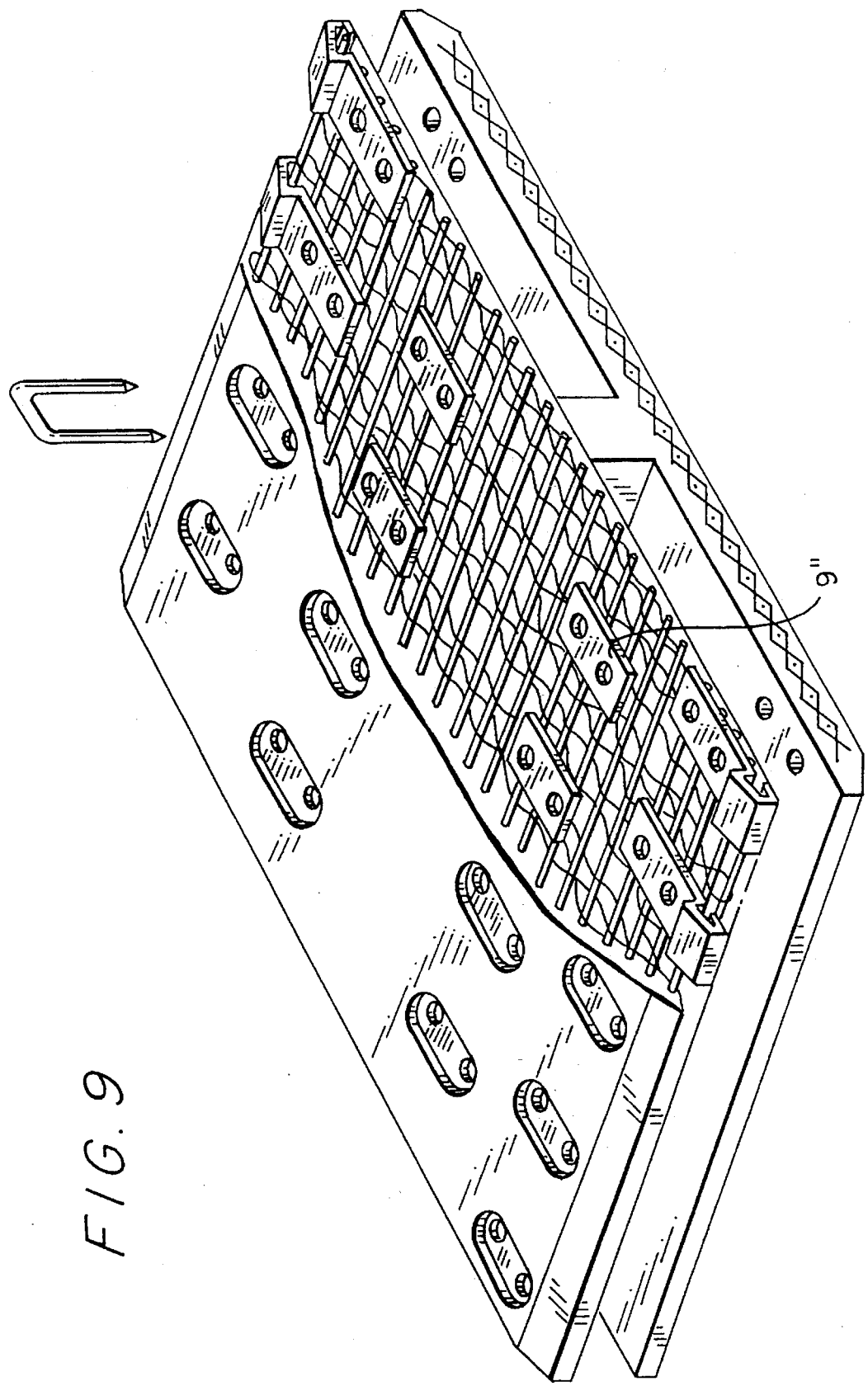

FIG. 5 represents a joining device according to the invention in which the reinforcement is of the woven type, the same joining device according to the invention being shown in perspective, with partial sectional view, on FIG. 9.

The general drawing of the fabric reinforcement in cross-sectional view is the same as that of the joining device according to the invention, the reinforcement comprising two separate parallel layers, which link each one of the two opposed arms by crossing the central part.

Small bars or strips 9" can be observed, provided in this case with two holes, the fastening being carried out by means of double pointed studs. The trimming of these strips is obtained by clamping or friction of the strips against the reinforcement fabric, while the reinforcement itself is not positively trimmed to the strips. The fabric may be advantageously woven in such a way as the weft is more loose than the warp, in order to enable a certain elasticity, in relation with the constituent material of the joining device, the threads used for weaving having themselves a very low elasticity.

It will be observed that in both figures, the strips rooted in the arms portion forming the most distant edge with respect to the central part, in the longitudinal direction, are rooted in such a way as one of the bevelled edges of the strips is in alignment with the bevelled edge of the arm involved.

It is understood that in all the examples shown, none of the fastening methods is preferred, and still least none of the fastening methods is imposed. The perforated washers can be replaced by small bars, or strips, provided with one or two holes; the fastening means may be selected at will, provided they comprise a stem which crosses the holes and the conveyor belt; thus, rivets, screws and nuts, folded down pointed pins, double pointed folded down studs, or similar means can be used indifferently.

It has to be reminded that the joining devices according to the invention, may also be fastened by sticking or by vulcanisation. In this case, the reinforcements shown on the figures can be used without the provision of the washers or of the strips and obviously without trimming of these latter. However, it goes without saying that the special reinforcement configurations, provided for trimming, become useless, even though the reinforcements represented with strips or with washers can be used, without making provision of the strips or of the washers. Obviously, the more the adopted trimming arrangement is intricate, the less its utilisation, without washers or strips, even though it could be workable, is justified from an economical point of view. Last, it has to be reminded, that in particular in the case of the joining device achieved by extrusion or by hot pressing or calendering of a profile which is further cut out into sections, plastic materials or cut "plies reinforced" rubber can advantageously be utilised, for joining devices according to the invention, provided for applications in which the required strength does not make compulsory the provision of structured reinforcements. However, plastic materials, "cut plies reinforced" rubbers, can also be used, in the case where, instead of the extrusion method, a moulding technique is used for making singled joining devices according to the invention. However, reinforcements forming full voiles, the shape of which, in cross section is identical to that of the reinforcement shown, can also be used. These reinforcements are constituted in the case where manufacture is carried out by extrusion, with big lengths of profiles which are introduced in the threading dye and which are thus embedded in the mass of the extruded material. The methods enabling the correct wedging of these profiles in their exact location in the extruded product, are well known and their description is not required herewith.

In the same way, reinforcements forming full voiles, presenting the same shape in transversal cross-section, of limited dimensions, either because reinforcement sections, cut out from an extruded profile are involved, or because individually moulded pieces are involved, can be introduced in the moulds, wedged inside these latter by means of well known methods, the description of which is not required herewith, the moulding or the vulcanisation of the material being carried out around the said reinforcements.

The reinforcements with full voiles may be provided with previously drilled holes, for the passage of the fastening means which cross the arms and the ends of the conveyor belt.

However in certain applications, in order to have available a universal product, a joining device according to the invention, the arms and the reinforcement of which do not comprise at the starting stage, holes drilled either in the arms (or in the reinforcement) will be preferred; such a product may be fixed as such by sticking or vulcanisation; according to a second way of utilisation, it could be provided with holes according to a pattern selected on demand by the user, for instance by drillings carried out, using preferably a drilling pattern, and according to a third way of utilisation it could be provided with washers or strips which will be located, before the setting of the through crossing fastening means, in recesses obtained by drilling or by milling the constituent material of the arms, the depth of the recesses corresponding to the thickness of the washers or of the strips.

This third way of utilisation can be particularly considered in the case where the reinforcement is made up of a fabric (as in the joining device according to the invention shown on FIGS. 5 and 9) or in the case where the reinforcement is made up of a full voile, not shown on the figure. In all these cases, the washers or strips may be, during the setting of the fastening means, advantageously compressed against the reinforcement by these latter, in order to pinch the reinforcement and to obtain a trimming of the washers to the reinforcement, thanks to a friction effect. In the same way, the washers can be suppressed, while obtaining the same effect than the one they assure, i.e. the strengthening of the passage of the fastening means stems and the clamping on the reinforcement, either direct or through a thin layer of the constituent material of the joining device according to the invention, by using screws with large diameter heads with a shape quite similar to that of the washers, which can be received in the milled holes carried out as explained hereabove, in the case of the washers.

Last, the fastening of the joining devices according to the invention can be carried out obviously on the ends of the conveyor belt by combining sticking or vulcanisation, already described, with fastening using fastening means provided with stems, as already explained. In this case the number of the fastening means provided with stems can be lower than if fastening means alone are used, and the operation of the conveyor belt can be possibly resumed earlier than in the case where sticking or vulcanisation are used alone.

The term cable is used all along the description in its generic meaning; it is applied to stranded wires or twisted textile threads, as well as to multi-plies metallic twisted cables and even to single fibre of plastic material. Advantageously, they are of the type used in the rubber industry or in the plastic material industry, and they benefit of good adhesion qualities in moulded, vulcanised or extruded materials.

Also, it has to be understood that one of the essential feature of the joining devices according to the invention lies upon the great extension of the arms in the longitudinal direction, afforded by the flexibility of these latter, thus enabling either to set a big number of through crossing fastening means, as a matter of fact a bigger number, if required, than in the several examples shown, or to have available larger sticking or vulcanisation surfaces, on both sides of the conveyor belt, assuring in that way an excellent fastening. Owing to the fact that the flexibility and the elasticity of the joining device according to the invention are equal or at least close to those of the conveyor belt, the arms, in spite of their large extension, lend themselves to all the temporary distortions to which the conveyor belt is submitted in course of operation.

What is claimed is:

1. A joining device for conveyor belts having generally an H profile lateral shape, a central part of which, corresponding to the bar of the H profile, is extended by two pairs of arms forming the branches of the H profile, the arms having in the longitudinal direction an extension several times longer than the space between two parallel arms and located on the same side of the central part, the central part as well as the arms being made up of a flexible and elastic material, the flexibility and elasticity of which are close to those of the constituent material of the conveyor belts for which the joining device is provided, comprising flexible reinforcement means extending in the arms and in the central part, wherein the reinforcement means present a certain elasticity; and means for the reinforcement means to yield themselves longitudinally up to a certain limit, when submitted to forces acting in the longitudinal direction, and for being brought back to their initial dimension by the constituent elastic material of the joining device, when these forces are decreasing.

2. The joining device according to claim 1, wherein the certain elasticity is substantially equal to the belt elasticity.

3. Joining device for conveyor belts according to claim 1, characterised by the fact that the constituent fabric of the reinforcement is woven in such a way as the weft is more loose than the warp.

4. Joining device for conveyor belts according to claim 1, characterised by the fact that the reinforcement is made up of cables, which are themselves very slightly extensible, but presenting zigzag shapes embedded in the constituent material of the joining device.

5. Joining device for conveyor belts according to claim 1, characterised by the fact that the reinforcement is made up of cables, which are themselves very slightly extensible, but presenting sinuosities embedded in the constituent material of the joining device.

6. Joining device for conveyor belts according to claim 1, characterised by the fact that the reinforcement means are arranged according to two layers, each one of the layers being embedded in two opposite arms, arranged on either sides of the central part, each one of the reinforcement layer crossing the central part of the joining device, by linking the part of the reinforcement layer embedded in the arms, while remaining in the same plane than these latter.

7. Joining device for conveyor belts according to claim 6, characterised by the fact that the reinforcement means further comprise two additional layers, each one embedded in two respective arms each one of these arms being located in a different plane, on either side of the central part of the joining device, the central parts of the two said layers connecting the parts embedded in the arms, by crossing in a skewed direction, the central part of the joining device and intersecting therein, the additional layers being located more inwardly than the other layers.

8. Joining device for conveyor belts according to claim 1, comprising strengthening washers or small drilled strips embedded in the arms of the joining devices in such a way as their holes are in alignment with the holes drilled in the arms, characterised by the fact that the reinforcements are trimmed to the washers or to the strips.

9. Joining device for conveyor belts according to claim 8, the reinforcement of which is made up of cables, characterised by the fact that each washer is surrounded about approximately 180° by a reinforcement cable loop.

10. Joining device for conveyor belts according to claim 8, characterised by the fact the washers or strips face directed outwardly presents, with respect to the corresponding external face of the arm considered, an inward distance at least equal to the height of the head of the fastening means with stems, provided for the fastening.

11. Joining device for conveyor belts according to claim 8, characterised by the fact that the cables which constitute the reinforcement are arranged in two layers, one of the layers connecting one arm to the opposite arm located on the other side of the central part in the same plane, the other layer connecting the two other opposite arms, while remaining in the same plane, short length cables called linking cables and arranged longitudinally, extending from one arm to the other and crossing the central part of the joining device, strips being trimmed through strengthening cables arranged transversally, these strengthening cables passing in through holes provided in the strips, the linking cables being bent around the strengthening cables to form trimming loops, the free end of the loop thus formed being embedded in the material, since it extends along the other end over a certain length.

12. Joining device for conveyor belts according to claim 1 claims, the arms edges of which located the more distant from the central part in the longitudinal direction are bevelled, the slope of the bevel beginning from the external surface and connecting the non-bellewed part of the edge, in such a way as the non-bellewed part has a relatively small height, characterised by the fact that the strips are rooted in the part of the arm which forms the edge which is the more distant from the central part in the longitudinal direction, in such a way as one of the edges of the strip has a bevelled shape and is in alignment with the bevelled edge of the arm involved.

13. Joining device for conveyor belts according to claim 12, characterised by the fact that the reinforcement is trimmed to the bevelled strips.

14. A method for joining conveyor belts, comprising:

providing a joining device having generally an H profile lateral shape, a central part of which, corresponding to the bar of the H profile, is extended by two pairs of arms forming the branches of the H profile, the arms having in the longitudinal direction an extension several times longer than the space between two parallel arms and located on the same side of the central part, the central part as well as the arms being made up of a flexible and elastic material, the flexibility and elasticity of which are close to those of the constituent material of the conveyor belts, comprising flexible reinforcement means extending in the arms and in the central part, wherein the reinforcement means present a certain elasticity and means for the reinforcement means to yield themselves longitudinally up to a certain limit, when submitted to forces acting in the longitudinal direction, and for being brought back to their initial dimension by the constituent elastic material of the joining device, when these forces are decreasing;

milling recesses at the locations selected by the user for the setting in position of the fastening means with stems;

setting in position the fastening means with stems;

the said recesses being provided for receiving the heads of the fastening means with round and large head stems.

15. A method for joining conveyor belts, comprising:

providing a joining device having generally an H profile lateral shape, a central part of which, corresponding to the bar of the H profile, is extended by two pairs of arms forming the branches of the H profile, the arms having in the longitudinal direction an extension several times longer than the space between two parallel arms and located on the same side of the central part, the central part as well as the arms being made up of a flexible and elastic material, the flexibility and elasticity of which are close to those of the constituent material of the conveyor belts, comprising flexible reinforcement means extending in the arms and in the central part, wherein the reinforcement means present a certain elasticity and means for the reinforcement means to yield themselves longitudinally up to a certain limit, when submitted to forces acting in the longitudinal direction, and for being brought back to their initial dimension by the constituent elastic material of the joining device, when these forces are decreasing;

milling recesses, prior to the setting of the fastening means with stems, in locations selected by the user for setting the fastening means with stems, the recesses being provided for receiving washers comprising through holes, setting washers with through holes in the recesses;

setting in position fastening means with stems are further on;

the depth of the milled recesses being at least equal to the thickness of the washers increased by the height of the fastening means head.

16. The method according to claim 15 wherein a fastening by sticking or by vulcanisation is combined with a fastening using fastening means with stems.

17. The method according to claim 15, wherein during the setting of the fastening means with stems, the washers or the strips or the large heads of the fastening means with stems, are forcibly pinched in the direction of the reinforcement sufficiently for trimming by friction against the reinforcement the said washers, the said strips or the said large heads of the fastening means.

18. The method according to claim 14 or 15, wherein since a certain quantity of the constituent material of the joining device remains in the form of a thin layer between the reinforcement and the washers, the strips or the large heads of the fastening means with stems, these latter are forcibly pinched against this thin material layer integral to the reinforcement, for trimming by friction the said washers, strips or heads of the fastening means with stem, to the assembly made up of the said thin layer of material and of the reinforcement.

19. The method according to claim 14, wherein a fastening by sticking or by vulcanization is combined with a fastening using fastening means with stems.

20. The method according to claim 14, wherein during the setting of the fastening means with stems, the washers or the strips or the large heads of the fastening means with stems, are forcibly pinched in the direction of the reinforcement sufficiently for trimming by friction against the reinforcement the said washers, the said strips or the said large heads of the fastening means.

21. The method according to claim 14, wherein since a certain quantity of the constituent material of the joining device remains in the form of a thin layer between the reinforcement and the washers, the strips or the large heads of the fastening means with stems, these latter are forcibly pinched against this thin material layer integral to the reinforcement, for trimming by friction the said washers, strips or heads of the fastening means with stem, to the assembly made up of the said thin layer of material and of the reinforcement.

* * * * *